United States Patent Office 3,702,648
Patented Nov. 14, 1972

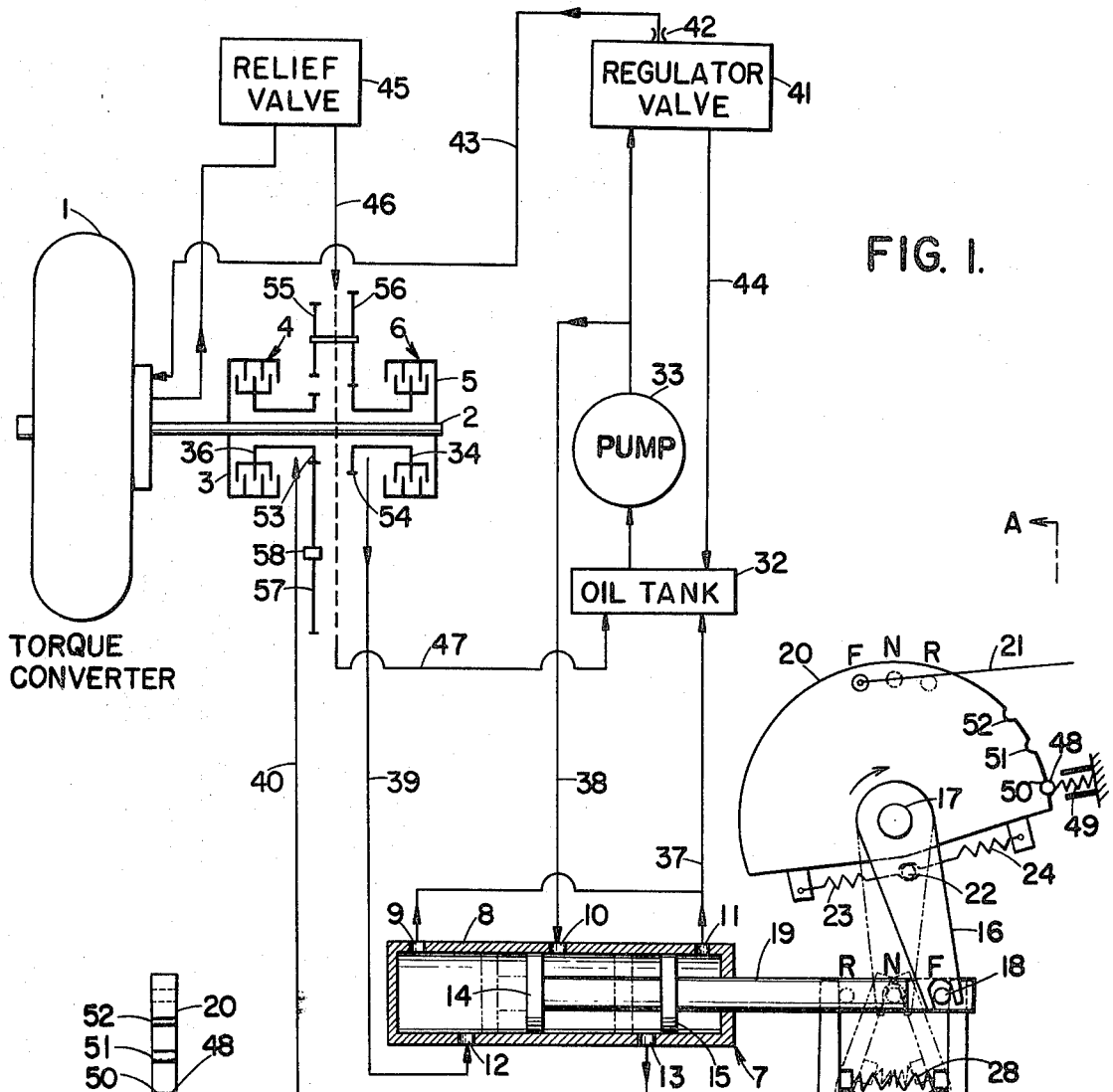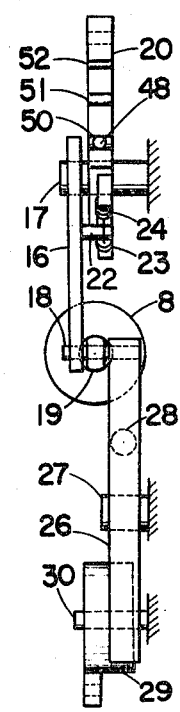

3,702,648
BRAKE RELEASE REVERSING TRANSMISSION CLUTCHES
Takami Mori, Yokosuka, Japan, assignor to Okamura Manufacturing Company, Limited, Yokohama, Japan
Filed Sept. 19, 1969, Ser. No. 859,460
Claims priority, application Japan, Oct. 14, 1968, 43/74,144
Int. Cl. F16d 67/04; B60k 29/02
U.S. Cl. 192—4 C
2 Claims

ABSTRACT OF THE DISCLOSURE

A power intercepting and low-speed rotating mechanism having a transmission with fluid activated first and second clutch means and a brake means and having a selector valve for supplying fluid under pressure either to the first or second clutch means to effect actuation thereof. The selector valve is manually operated to position the valve for establishing forward or rearward drive on the output shaft of the transmission. The manual means for operating the selector valve is spring-loaded and mechanically connected with the brake system. When the brake is effected, the selector valve is shifted towards a neutral position irrespective of the selected position thereof so that the clutch means may be entirely or partly declutched. Upon release of the brake, the selector valve returns, by force of the spring, to its selected position to recover the drive forwardly or rearwardly.

---

In the power transmission mechanism of for instance a fork lift truck or other vehicles where power is transmitted through a torque converter or other transmission gears, usually the output shaft of the transmission gear is coupled to the hydraulically operated normal-rotating clutch and the reversing clutch, and pressure oil is supplied through a selector valve to one of said clutches or such supply of pressure oil to either of said clutches is suspended, so as to perform normal or reverse driving operation or to intercept transmission of power.

In such mechanism, when it is desired to intercept power transmission to the follower members or to rotate them at extremely low speed, it needs to release the clutch or to create a so-called half-clutched condition. To this end, there have heretofore been proposed several devices, among which the most typical one is that an escape valve interlocked with the braking mechanism is provided in front of the selector valve, said escape valve being arranged such that upon actuation of the brake, supply of pressure oil to the clutches is suspended, irrespective of the position of the selector valve.

However, such system requires two different types of valves, which makes complicated the structure and piping arrangement. Further, close attention and skill are required for adjustment and operation of the system, so that it is hard to achieve accurate and sure control with ease and smoothly.

The present invention is designed to perfectly overcome these and other defects inherent to the conventional devices, by providing an improved system in which suspension of power transmission of imperfect transmission of power can be achieved, as so desired, with smooth and proper operation while allowing the required clutch to stay in a condition ready for operation.

Now, the invention will be discussed in detail by way of its embodiment illustrated in the accompanying drawings.

In the drawings:

FIG. 1 is a flow sheet illustrating the general mode of practice of the present invention; and FIG. 2 is a side view as taken along the line A—A of FIG. 1.

Referring generally to the drawings, it will be noted that a torque converter 1 connected to an engine (not shown) has an output shaft 2 to which a clutch disc 3 of the normal-acting clutch assembly 4 and a clutch disc 5 of the reversing clutch assembly 6 are secured.

Selector valve assembly 7 consists of a cylinder 8 having formed at its top side three spaced openings 9, 10 and 11 and at its underside two spaced openings 12 and 13, and two-staged pistons 14 and 15 inserted into said cylinder. It will also be noted that the forked portion at the end of a lever 16 adapted rotatably about a shaft 17 fixed to a structural part of the machine is engaged with a pin 18 provided projecting laterally at the proximal end of a piston rod 19. Said shaft 17 is loosely fitted in a central hole of a half-circular plate 20 arranged rotatable through a rod 21 by a manually operated lever (not shown), and between the center part 22 of said lever 16 and both sides of the bottom of said half-circular plate 20 are provided tension springs 23 and 24, so that rotating force of the half-circular plate 20 is transmitted to the lever 16 through said tension springs 23 and 24.

Now, when the half-circular plate 20 is rotated by the manual lever to actuate the lever 16 to move the pin 18 of the piston rod 19 to its outermost position, or the position F, thereby allowing both pistons 14 and 15 to take the solid-line position in FIG. 1, there is established communication between the openings 9 and 12 and between the openings 10 and 13, while communication between the openings 11 and 13 is intercepted, whereby the normal-acting clutch assembly 4 is turned into an actuated condition. When the pin 18 is moved to the position N, causing the pistons 14, 15 to take the phantom-lined position, the openings 9 and 12 and the openings 11 and 13 are communicated, respectively, while communication between the openings 10 and 12 and between the opening 10 and 13 is intercepted, whereby a neutral condition is created. When the pin 18 is further moved leftwise to the position R, said both pistons 14, 15 are also accordingly moved leftwise, causing the openings 10 and 12 and the openings 11 and 13 to communicated with each other, while intercepting communication between the openings 9 and 12, whereby the reversing clutch 6 is rendered into an actuated condition.

Left and right holding levers 25 and 26 are pivotally secured substantially at their central portions by a horizontal shaft 27 planted to a structural part of the machine below the piston rod 19, and a compression spring 28 is mounted between the insides of the top portions of said levers 25 and 26. Said levers 25 and 26 are also so arranged that the insides of the top end portions thereof abut to the pin 18 in accordance with rotation of said levers.

Between the insides of lower portions of said holding levers 25 and 26 are mounted a cam 29 which is pivotally supported by a horizontal shaft 30 planted to a structural part of the machine and is also so adapted as to be rotated by a rod 31 coupled to the brake pedal (not shown).

Under the condition where the brake pedal is released, the protruded portions of the cam 29 stay in the solid line position, that is, they do not push out the lower portions of the levers 25 and 26 so that the top portions of said levers remain spread out by the compression spring 28 and are positioned outside of the pin 18 located at the position F or R. However, when the brake pedal is stepped on, the rod 31 is moved rightwise, causing the cam 29 to rotate substantially 90 degrees, whereby the protruded portions of the cam now push out the bottom portions of the holding levers 25 and 26, thus urging the top portions of said levers to approach to each other toward the center position N.

The openings 9 and 11 are connected to an oil tank 32, the opening 10 to a discharge port of an oil pump 33, the opening 12 to the working part of a pressing element 34 in the reversing clutch assembly 6, and the opening 13 to the working part of a pressing element 36 in the normal-acting clutch assembly 4, through the lines 37, 38, 39 and 40, respectively.

As will also be seen in the drawing, the discharge port of the oil pump 33 is connected to a clutch pressure regulating valve means 41. A regulated oil pressure is applied, through an orifice 42, to the one-way valve of the torque converter 1 from the valve means 41. The clutch pressure regulating valve means 41 is adapted to automatically control clutch pressure in accordance with variation of the discharge amount of the pump 33 with variation of rotational frequency of the engine, so that the clutch is supplied with oil of always substantially constant pressure.

However, this clutch pressure regulating valve means per se is of the type known in the art and does not form a part of the present invention, so that no need is seen of giving detailed explanation of this valve. Numerical reference 44 denotes a line through which discharge oil in the clutch pressure regulating valve means 41 is returned to the tank 32.

45 signifies a relief valve adapted to always keep constant oil pressure in the torque converter 1. Oil released therefrom is passed through line 46 into the clutch assemblies to lubricate them and then is returned to the tank 32 via line 47.

48 is a ball member afforded with projecting force by a spring 49 so as to be fitted in one of the half-circular recesses 50, 51 and 52 formed at the periphery of the half-circular plate 20, as said half-circular plate 20 is rotated to move the pin 18 to one of the three positions F, N and R.

The half-circular plate 20 is provided with certain fixed resistance force in each of its rotational positions so that it won't be moved even if the level 16 is forced to rotate against the force of the springs 23 and 24. The half-circular plate 20 may be locked by locking the manual operating lever itself at a desired position.

The low-speed rotating device of the present invention has the just described construction, so that when the half-circular plate 20 is turned over a certain predetermined angular distance by the manual lever to actuate the piston rod 19 in the selector valve assembly 7, pressure oil is fed by the oil pump 33 into the normal-acting or reversing clutch assembly 4 or 6, and under this condition, when the brake pedal is slightly depressed to brake the working part or running means of the engine, the pin 18 is moved towards the neutral position N by the action of the holding levers 25 and 16, in the manner described above, whereby the clutch assembly in operation is reduced in its coupling force and turned into a so-called half-clutched condition.

Upon release of the brake pedal, the cam 29 is returned to its original position due to restoring force of the brake pedal itself, so that the top portions of the holding levers 25 and 26 are spread out again by the spring 28, allowing the lever 16 to return to its initial position. That is, the selector valve assembly 7 is returned to the position where it was first operated by the manual lever.

It is thus possible to perform smooth low-speed operation or inching by breaking the working parts of the engine or their running positions under a normally or reversely rotating condition and by reducing power transmission thereto.

When the brake pedal is stepped onto its limit to produce full braking performance, the pin 18, no matter what position it was in, is immediately moved to the the neutral position, and supply of oil pressure to any of the clutch assemblies from the oil pump 33 is stopped, irrespective of the rotational angular position of the half-circular plate 20 at that moment, thereby perfectly suspending power transmission.

It will be understood that in this instant, too, when the brake pedal is released, the top portions of the holding levers 25 and 26 are spread out and the lever 16 is urged by the tension springs 23 and 24 to return to a position defined by the half-circular plate 20, allowing the selector valve assembly 7 to return to a position corresponding to operation of the manual lever.

The coupled relation between the lever 16 and the half-circular plate 20 through left and right tension springs 23, 24 is designed such as to inhibit rotation of the half-circular plate 20 by the check ball 48 when the lever 16 is rotated in conformity to actuation of the manual lever and to allow the lever 16 to return to its normal position, or the central position of the half-circular plate 20, when the top portions of the holding levers 25 and 26 are spread out.

Numerical references 53, 54, 55, 56 and 58 in FIG. 1 represent gears interconnected with the torque converter shaft 2 for driving the output shaft 58 of the transmission in a forward or rearward direction.

In the present invention, the type of the selector valve assembly, its operating means, means for locking the half-circular plate at its respective rotational positions, and means for coupling the holding levers and the braking mechanism are not limited to the particular ones shown herein, but they may be embodied in various other forms without departing from the spirit of the present invention.

I claim:

1. A power intercepting and low speed rotating mechanism comprising:

a first hydraulically operated clutch for establishing a forward drive;

a second hydraulically operated clutch for establishing a reverse drive;

a cylinder having a change-over piston rod;

a selector valve adapted to feed hydraulic fluid to said first clutch and discharge hydraulic fluid from said second clutch when said piston rod is in a first position, to discharge hydraulic fluid from said first and second clutches when said piston rod is in a second position, and to feed hydraulic fluid to said second clutch when said piston rod is in a third position;

a lever pivotally supported on an axis and coupled to said piston rod, and operative to actuate said piston rod;

a coupling member pivotally supported on the same axis as said lever and coupled to a manually operated member, said coupling member and said lever being yieldably rotationally coupled to each other through at least one spring;

a braking means; and means coupled to said braking means and said piston rod operative to force said piston rod to a position causing said piston rod to be in said second position, irrespective of the position of said coupling member, upon actuation of said braking means.

2. A power intercepting and low speed rotating mechanism comprising:

a first hydraulically operated clutch for establishing a forward drive;

a second hydraulically operated clutch for establishing a reverse drive;

a selector valve cylinder having a change-over piston rod adapted to feed hydraulic fluid to said first clutch and discharge hydraulic fluid from said second clutch when said piston rod is in a first position, to discharge hydraulic fluid from said first and second clutches when said piston rod is in a second position, and to feed hydraulic fluid to said second clutch and discharge fluid from said first clutch when said piston rod is in a third position;

a lever pivotally supported on an axis and coupled to said piston rod, and operative to actuate said piston rod;

a coupling member pivotally supported on the same axis as said lever and coupled to a manually operated member;

said coupling member and said lever being yieldably rotationally coupled to each other through at least one spring;

a braking means; and first and second holding levers pivotally supported on an axis, said first lever unilaterally engaging a member on said piston rod so as to be operative, upon actuation, to force said piston rod from said first position to said second position, said second lever unilaterally engaging a member on said piston rod so as to be operative, upon actuation, to force said piston rod from said third position to said second position; and cam means coupled to said braking means and adapted to be actuated thereby, said cam means engaging said first and second levers and operable to force said piston rod to be in said second position, irrespective of the position of said coupling member, upon actuation of said braking means.

References Cited
UNITED STATES PATENTS

| | | | |
|---|---|---|---|
| 2,883,015 | 4/1959 | Schroeder | 192—4 A |
| 3,017,974 | 1/1962 | Lasley | 192—4 A |
| 3,135,367 | 6/1964 | Gregorich | 192—4 C |
| 3,441,114 | 4/1969 | Pensa | 192—4 C |
| 3,349,860 | 10/1967 | Ross | 192—4 B X |

BENJAMIN W. WYCHE, Primary Examiner

U.S. Cl. X.R.

192—13 R, 87.19; 251—229, 243